(12) United States Patent
Ahles et al.

(10) Patent No.: US 11,552,844 B1
(45) Date of Patent: Jan. 10, 2023

(54) PERSISTENT STORAGE FOR SERVER CLUSTERS

(71) Applicant: Target Brands, Inc., Minneapolis, MN (US)

(72) Inventors: Matthew I. Ahles, St. Paul, MN (US); Timothy J. Guertin, Minneapolis, MN (US); Chad R. Pruden, Maple Grove, MN (US); Andrew Ray, Anoka, MN (US); Junpu Fan, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/717,634

(22) Filed: Apr. 11, 2022

(51) Int. Cl.
*H04L 41/0806* (2022.01)
*H04L 41/0893* (2022.01)
(Continued)

(52) U.S. Cl.
CPC ........ *H04L 41/0806* (2013.01); *G06F 3/0628* (2013.01); *G06F 3/0637* (2013.01);
(Continued)

(58) Field of Classification Search
CPC ......... G06F 3/0628–0637; G06F 3/067; G06F 9/50–5016; G06F 2009/45558;
(Continued)

(56) References Cited

U.S. PATENT DOCUMENTS

| 7,379,990 | B2 * | 5/2008 | Tsao ........................ H04L 67/02 709/225 |
| 8,255,538 | B1 * | 8/2012 | Lam ...................... G06F 3/0635 370/363 |

(Continued)

OTHER PUBLICATIONS

Irwin, David, et al., "Sharing networked resources with brokered leases", in: USENIX Annual Technical Conference, Boston, Massachusetts, US.*

(Continued)

*Primary Examiner* — Brendan Y Higa
(74) *Attorney, Agent, or Firm* — Theodore M. Magee; Westman, Champlin & Koehler, P.A.

(57) ABSTRACT

A computer-implemented method includes receiving a request to provision a set of storage volumes for a server cluster, wherein the request includes an identifier for the server cluster and generating a provisioning work ticket for each storage volume in the set of storage volumes, each provisioning work ticket including the identifier for the server cluster. The provisioning work tickets are provided to a message broker. Multiple volume provisioning instances are executed such that at least two of the volume provisioning instances operate in parallel with each other and such that each volume provisioning instance receives a respective provisioning work ticket from the message broker and attempts to provision a respective storage volume of the set of storage volumes for the server cluster in response to receiving the volume provisioning work ticket.

20 Claims, 8 Drawing Sheets

(51) Int. Cl.
*H04L 9/40* (2022.01)
*G06F 3/06* (2006.01)
*G06F 9/50* (2006.01)

(52) U.S. Cl.
CPC ........ *G06F 9/5077* (2013.01); *H04L 41/0893* (2013.01); *H04L 63/10* (2013.01)

(58) Field of Classification Search
CPC .......... G06F 2009/45583; G06F 9/5061–5077; H04L 41/08; H04L 41/0893–0895; H04L 49/356–358; H04L 63/10–108
See application file for complete search history.

(56) References Cited

U.S. PATENT DOCUMENTS

| | | | |
|---|---|---|---|
| 8,291,159 B2 | 10/2012 | Rajagopal et al. | |
| 8,583,876 B2* | 11/2013 | Taguchi | G06F 3/0637 |
| | | | 710/36 |
| 8,782,238 B2 | 7/2014 | Witt et al. | |
| 9,240,985 B1* | 1/2016 | Potakamuri | H04L 63/08 |
| 9,313,208 B1* | 4/2016 | Letz | G06Q 10/0631 |
| 9,348,724 B2 | 5/2016 | Ota et al. | |
| 9,383,924 B1 | 7/2016 | Fullbright et al. | |
| 9,996,463 B2 | 6/2018 | Keller | |
| 10,228,856 B2 | 3/2019 | Krishnamurthy et al. | |
| 10,705,740 B2 | 7/2020 | Catrein et al. | |
| 10,705,865 B2 | 7/2020 | Simoncelli | |
| 2004/0221049 A1* | 11/2004 | Blumenau | H04L 63/101 |
| | | | 707/999.1 |
| 2013/0055249 A1* | 2/2013 | Vaghani | G06F 9/45558 |
| | | | 718/1 |
| 2013/0166747 A1* | 6/2013 | Lam | G06F 3/0635 |
| | | | 709/225 |
| 2015/0052518 A1 | 2/2015 | Sarisky et al. | |
| 2017/0208052 A1* | 7/2017 | Jai | H04L 63/08 |
| 2020/0034057 A1* | 1/2020 | Srinivasan | G06F 3/0604 |
| 2021/0216345 A1 | 7/2021 | Natu et al. | |

OTHER PUBLICATIONS

Fan, Application Aware Workload Allocation for Edge Computing based IOT, IEEE Internet of Things Journal, vol. 5, No. 3, pp. 2146-2153, retrieved at https://web.njit.edu/~ansari/papers/18IoT-Fan.pdf, Jun. 2018.

* cited by examiner

PERSISTENT STORAGE FOR SERVER CLUSTERS

BACKGROUND

A server cluster is a collection of compute providers that are each configured to execute the same software. There are different types of compute providers including containers, virtual machines and physical devices. In general, multiple containers and virtual machines can be executed on a single physical device. Each compute provider is referred to as an instance of the software and the software is generally referred to as an application.

In order to make an application available for use, the application's developer must request the creation of a server cluster and then must deploy their application to each compute provider in the server cluster. In addition, for applications that require that the compute provider have access to persistent storage such as found in a disc drive or solid-state memory, the application's developer must provision persistent storage for each compute provider in the cluster.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a request to provision a set of storage volumes for a server cluster, wherein the request includes an identifier for the server cluster and generating a provisioning work ticket for each storage volume in the set of storage volumes, each provisioning work ticket including the identifier for the server cluster. The provisioning work tickets are provided to a message broker. Multiple volume provisioning instances are executed such that at least two of the volume provisioning instances operate in parallel with each other and such that each volume provisioning instance receives a respective provisioning work ticket from the message broker and attempts to provision a respective storage volume of the set of storage volumes for the server cluster in response to receiving the volume provisioning work ticket.

In accordance with a further embodiment, a system includes a cluster manager configured to define and manage a server cluster and a persistent storage manager. The persistent storage manager is configured to receive a request for a set of storage volumes for the server cluster wherein the request comprises an identifier for the server cluster and provide an identifier for the requested set of storage volumes. A request for a lease for a storage volume in the set of storage volumes is received where the request includes the identifier for the set of storage volumes and an IP address of a compute provider that will access the storage volume. In response to receiving the request for the lease, the persistent storage manager verifies with the cluster manager that the IP address of the compute provider is part of the server cluster.

In accordance with a further embodiment, a method includes receiving a request for an IP address to access to a storage volume in a set of storage volumes. An identifier for the storage volume is used to identify a server cluster associated with the set of storage volumes. After verifying that the IP address is part of the server cluster, the IP address is provided access to the storage volume.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For application developers who are unfamiliar with the provisioning of persistent storage, provisioning and managing persistent storage for each compute provider in a cluster can be difficult. Embodiments described below provide means for provisioning persistent storage for a cluster and for allowing compute providers to acquire leases to provisioned persistent storage as the compute providers are brought online. In particular, the embodiments improve computing systems used to provision persistent storage for a cluster of compute providers by reducing the time needed to provision the persistent storage and by making the leasing of such persistent storage to compute providers more secure.

Figure 1:
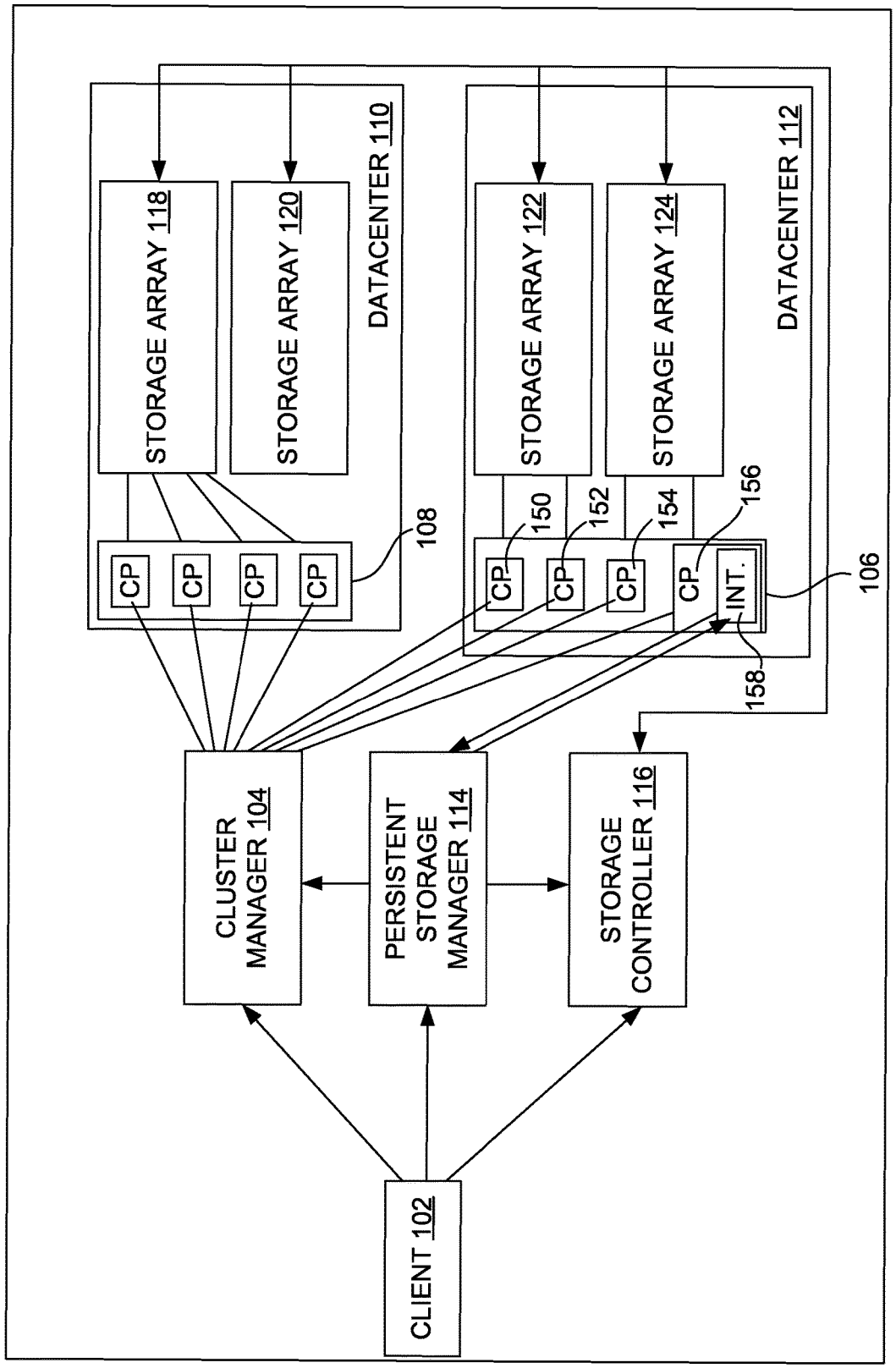
FIG. 1 is block diagram of computing environment used in accordance with the various embodiments.
Figure 2:
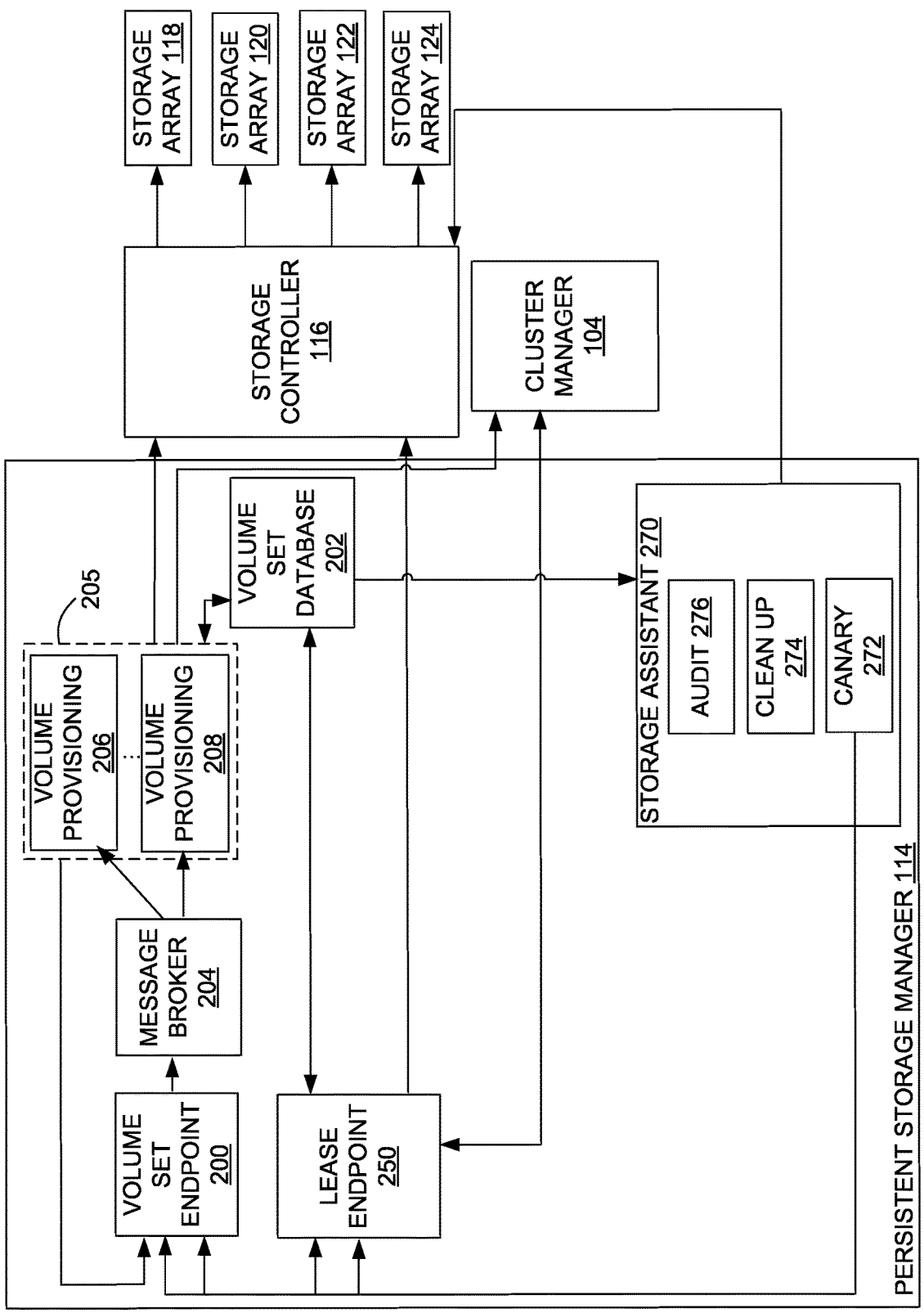
FIG. 2 is a block diagram of the computing environment of FIG. 1 showing more details of the persistent storage manager.

FIG. 1 provides a block diagram of a computing environment 100 for defining and instantiating server clusters and provisioning and leasing storage volumes for the compute providers in each server cluster. FIG. 2 is a block diagram of a portion of computing environment 100 showing internal components of a persistent storage manager 114.

In FIG. 1, a client device 102 uses a cluster manager 104 to define and instantiate one or more server clusters such as server cluster 106 and server cluster 108. Each server cluster consists of a number of compute providers such as compute providers 150, 152, 154 and 156 of server cluster 106. The compute providers can take the form of containers, virtual machines, or physical devices. The collection of physical devices that a server cluster can be instantiated on are referred to as an availability zone. Such availability zones can be located within a single data center, such as data centers 110 and 112, or can be distributed across multiple data centers. In most architectures, an availability zone is limited to physical devices located in a common geographic region and/or physical devices owned by a common operator. Thus, a single region will have multiple data centers and multiple availability zones.

Client device 102 is also used to request persistent storage for each server group using persistent storage manager 114. Persistent storage manager 114 receives requests to provision a set of storage volumes for a cluster and uses a storage controller 116 to provision the storage volumes in storage arrays such as storage arrays 118, 120, 122 and 124. Details for provisioning the storage volumes are provided below. Once the set of storage volumes have been provisioned for the cluster, persistent storage manager 114 receives lease requests from compute provider instances as they are started by cluster manager 104. In accordance with one embodiment, each compute provider includes an initialization routine, such as initialization routine 158 of compute provider 156, that requests a lease to a storage volume assigned to cluster 106 in a call to persistent storage manager 114. In response, persistent storage manager 114 performs a security check on the compute provider as discussed further below and when the compute provider passes the security check, instructs storage controller 116 to provide the compute provider with access to a storage volume.

Figure 3:
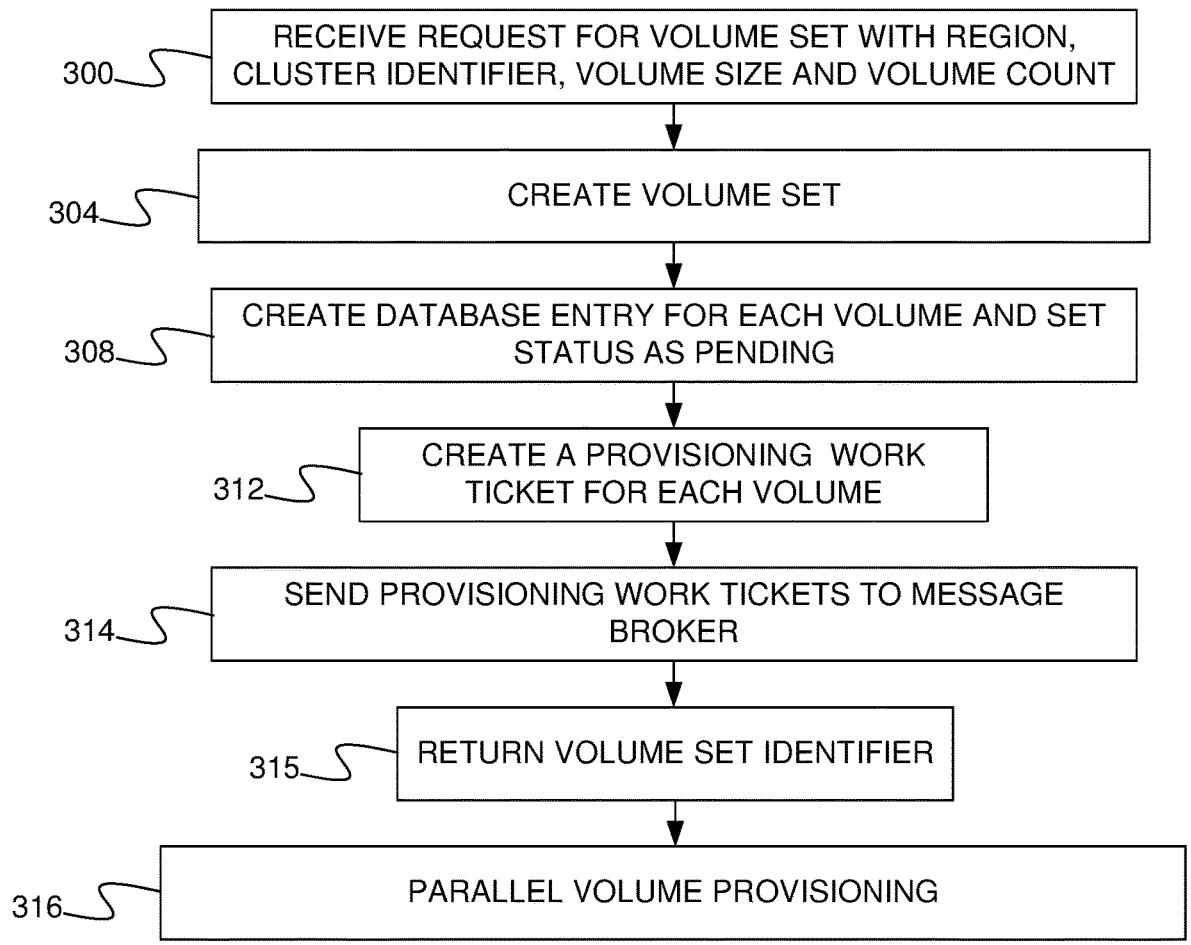
FIG. 3 is a flow diagram of a method of processing a request for the provisioning of a set of storage volumes for a server cluster.

FIG. 3 provides a flow diagram of a method performed when client device 102 requests a volume set for a server cluster. In step 300, the request for the volume set is received in persistent storage manager 114 at a volume set endpoint 200 shown in FIG. 2. In accordance with one embodiment, the request is made using an HTTP POST method with a body that includes the region where the volume set is to be provisioned, a unique identifier for the server cluster, the size of each storage volume that is to be created for the set of storage volumes, and the number of storage volumes that are to be created in the set of storage volumes. Optionally, the body can also include a quality-of-service identifier and a data protection schedule identifier for the set of storage volumes. The quality-of-service identifier uniquely identifies a quality-of-service definition that describes the minimum number of input/output operations per second that each storage volume in the set of storage volumes must support and, in some cases, the maximum number of input/output operations per second that each storage volume will be expected to support. The data protection schedule identifier uniquely identifies a schedule for backing up each storage volume in the set of storage volumes.

At step 304, volume set endpoint 200 creates a volume set entry in volume set database 202. In creating the database entry for the volume set, a unique identifier for the volume set is created.

At step 308, volume set endpoint 200 generates a separate database entry for each storage volume that is to be provisioned for the server cluster and sets the status of each storage volume as PENDING. Volumes with a PENDING status cannot be leased to a compute provider.

At step 312, volume set endpoint 200 creates a provisioning work ticket/request for each storage volume requested for the set. For example, if the request for the set of storage volumes indicates that ten storage volumes should be provisioned, ten provisioning work tickets/requests are created by volume set endpoint 200. Each provisioning request includes the requested storage volume size, the region, the cluster identifier, and a retries-remaining value. The retries-remaining value represents the number of times that an attempt should be made to provision the storage volume. As discussed further below, when the retries-remaining value reaches zero, no further efforts are made to provide the storage volume.

At step 314, volume set endpoint 200 sequentially sends the provisioning work tickets/requests to a message broker 204, which places the requests in a queue in the order that they are received. At step 315, the volume set identifier is returned to client device 102 by volume set endpoint 200 together with an indication that the request for the volume set has been received.

Message broker 204 holds the provisioning work tickets/requests in the queue until message broker 204 receives a request for a provisioning work ticket. With each request for a provisioning work ticket, message broker 204 removes the oldest provisioning work ticket from the queue and sends it to the requestor.

Instances 205 of a volume provisioning service, such as volume provisioning instances 206 and 208, send requests for the provisioning work tickets to message broker 204. Each ticket request returns a different provisioning work ticket for a different storage volume of the set of volumes that were requested in step 300. In accordance with one embodiment, multiple volume provisioning instances execute at the same time. As a result, multiple storage volumes of the set of storage volumes are provisioned in parallel with each other at step 316.

The architecture described above improves the computing system in several ways. First, by allowing each volume provisioning instance to control when it requests a next volume provisioning ticket, the architecture prevents the volume provisioning instances from being overwhelmed by the provisioning work tickets/requests. When a large number of volume provisioning work tickets are received at a same time, the tickets are simply placed in the queue without making calls to the volume provisioning instances. This allows the volume provisioning instances to work on provisioning a volume without being interrupted to handle a new request for a volume. Second, the architecture improves the computing system by reducing the amount of time required to provision the storage volumes. In particular, the parallel volume provisioning instances are able to provision the storage volumes for a set of storage volumes faster than if all of the storage volumes in the set were provisioned sequentially.

Figure 4:
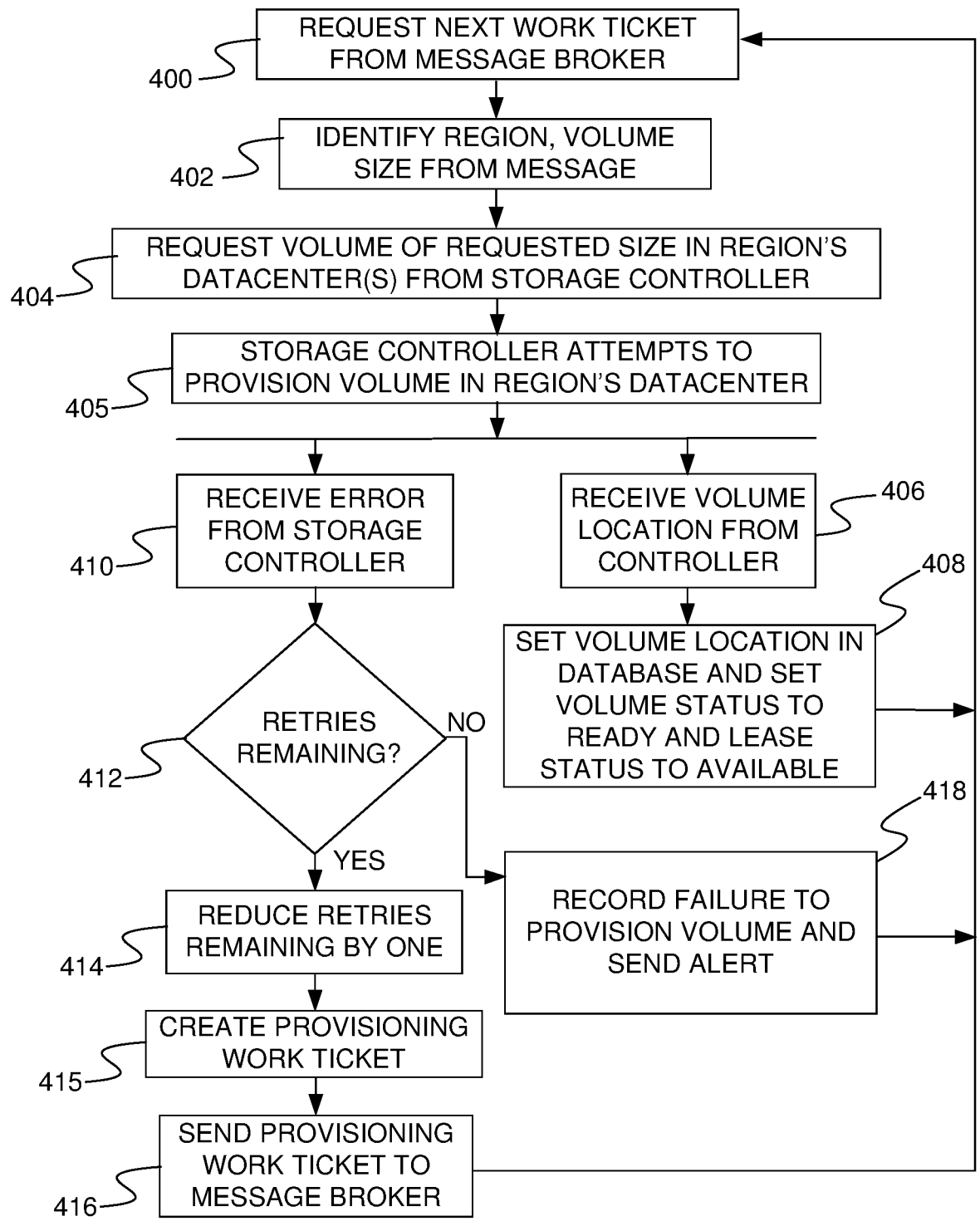
FIG. 4 is a flow diagram of a method for provisioning a volume.

FIG. 4 provides a flow diagram of a method used by each volume provisioning instance such as volume provisioning instances 206 and 208 to provision a storage volume for a server cluster. In step 400 of FIG. 4, the volume provisioning instance requests the next message from message broker 204. At step 402, the volume provisioning instance identifies the region and volume size by parsing the message from message broker 204. At step 404, the volume provisioning instance sends a request to storage controller 116 to provision a volume of the requested size in the region's datacenter(s). At step 405, storage controller 116 attempts to provision the requested volume in the region's datacenter(s) by, for example, provisioning the storage volume in one of the storage arrays 118, 120, 122 and 124.

If storage controller 116 is able to provision the volume, storage controller 116 returns the volume location to the volume provisioning instance at step 406. In response, the volume provisioning instance stores the volume location in volume set database 202 and sets the volume's status to READY and the volume's lease status to AVAILABLE at step 408. The volume provisioning instance then returns to step 400 to request the next volume provisioning work ticket from message broker 204.

If storage controller 116 is unable to provision the volume, storage controller 116 will return an error to the volume provisioning instance at step 410. At step 412, the volume provisioning instance will determine if there are any provisioning retries remaining for this volume. In particular, the volume provisioning instance will examine the retries-remaining value provided in the message from message broker 204 to determine if it is equal to zero. If there are no retries remaining at step 412, the volume provisioning instance records the failure to provision the volume and sends an alert about the failure at step 418. The process then returns to step 400 to request the next message from message broker 204. As a result, the status of the volume in volume set database 202 remains at PENDING.

If the retries-remaining value is greater than zero at step 412, the volume provisioning instance reduces the retries-remaining value by one at step 414 and creates a new provisioning work ticket with the reduced retries-remaining value at step 415. In accordance with one embodiment, the volume provisioning work ticket created in step 415 is identical to the volume provisioning work ticket received from message broker 204 except for the change in the retries-remaining value.

At step 416, the volume provisioning instance sends the new volume provisioning work ticket to message broker 204 and message broker 204 adds the new volume provisioning work ticket to its queue of volume provisioning work tickets. When this volume provisioning work ticket is requested by a volume provisioning instance, the volume provisioning instance will once again attempt to provision the volume. By using message broker 204 to facilitate repeated attempts to provision a volume, the embodiments improve the computing system by preventing the system from becoming overwhelmed by retry attempts when storage controller 116 is unable to provision volumes for a particular region for a period of time. In particular, the current architecture allows requests for volume provisioning for other regions to be interspersed with volume provisioning retries for a problematic region. Without the current architecture, the volume provisioning instances would make sequential retries at provisioning the volume in the problematic region while ignoring volume provisioning requests for other regions. Thus, the current architecture allows volume provisioning requests for other regions to be satisfied while the problematic region is offline and allows the volume provisioning requests for the problematic region to be satisfied once the problematic region comes back online.

Figure 5:
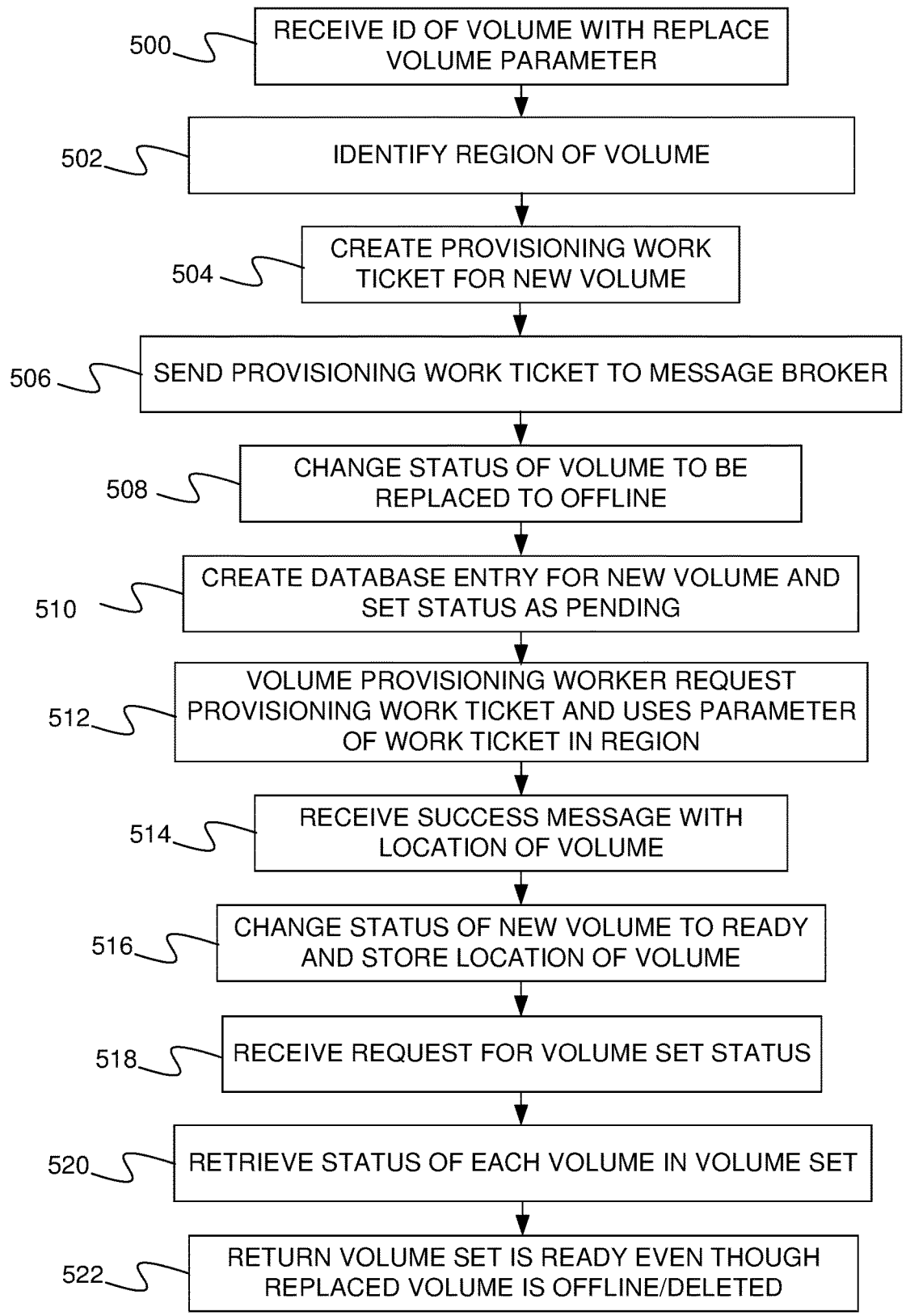
FIG. 5 is a flow diagram of a method of processing a request to replace a volume.

FIG. 5 provides a flow diagram of a method of replacing a volume designated for a volume set with a different volume. In accordance with several embodiments, a volume set can have a status of PARTIAL, READY and DELETED. A volume set will be in a PARTIAL status if one or more volumes in the set have a status of PENDING or BAD RECORD. As noted above, if storage controller 116 is unable to provision a volume in the volume set, the status of that volume will remain at PENDING. As a result, the volume set will remain in a status of PARTIAL. In order to change the volume set status to READY, the volume that could not be provisioned must be replaced with a volume that can be provisioned.

At step 500 of FIG. 5, client device 102 uses an HTTP PUT method directed to volume set endpoint 200 to submit a replace_volume parameter and an identifier for the volume that is to be replaced. At step 502, the volume set endpoint 200 uses the identifier of the volume to retrieve the volume's region from volume set database 202.

At step 504, volume set endpoint 200 creates a provisioning work ticket for the new volume and at step 506 sends the provisioning work ticket to message broker 204. At step 508, volume set endpoint 200 changes the status of the volume to be replaced to OFFLINE. At step 510, volume set endpoint 200 creates a new database entry for the new volume and sets the status of that new volume to PENDING. This new database entry is tied to the volume set of the volume being replaced in volume set database 202.

At step 512, one of the volume provisioning instances, such as volume provisioning instances 206 and 208, requests the provisioning work ticket from message broker 204 and uses the parameters for the volume in the provisioning work ticket to request a volume in the region from storage controller 116. At step 514, a success message is received from storage controller 116 along with the location of the volume. At step 516, the volume provisioning instance changes the status of the new volume to READY and stores the location of the volume in volume set database 202.

At step 518, volume set endpoint 200 receives a request for the status of the volume set from client device 102. In response, at step 520, volume set endpoint 200 searches volume set database 202 for the status of every volume assigned to that volume set. At step 522, volume set endpoint 200 returns a status of PARTIAL for the volume set if any of the volumes in the volume set are in a PENDING status and returns a volume set status of READY if all of the volumes are READY, OFFLINE or DELETED. Thus, even though the replaced volume has a status of OFFLINE, the status of the volume set can be READY.

Figure 6:
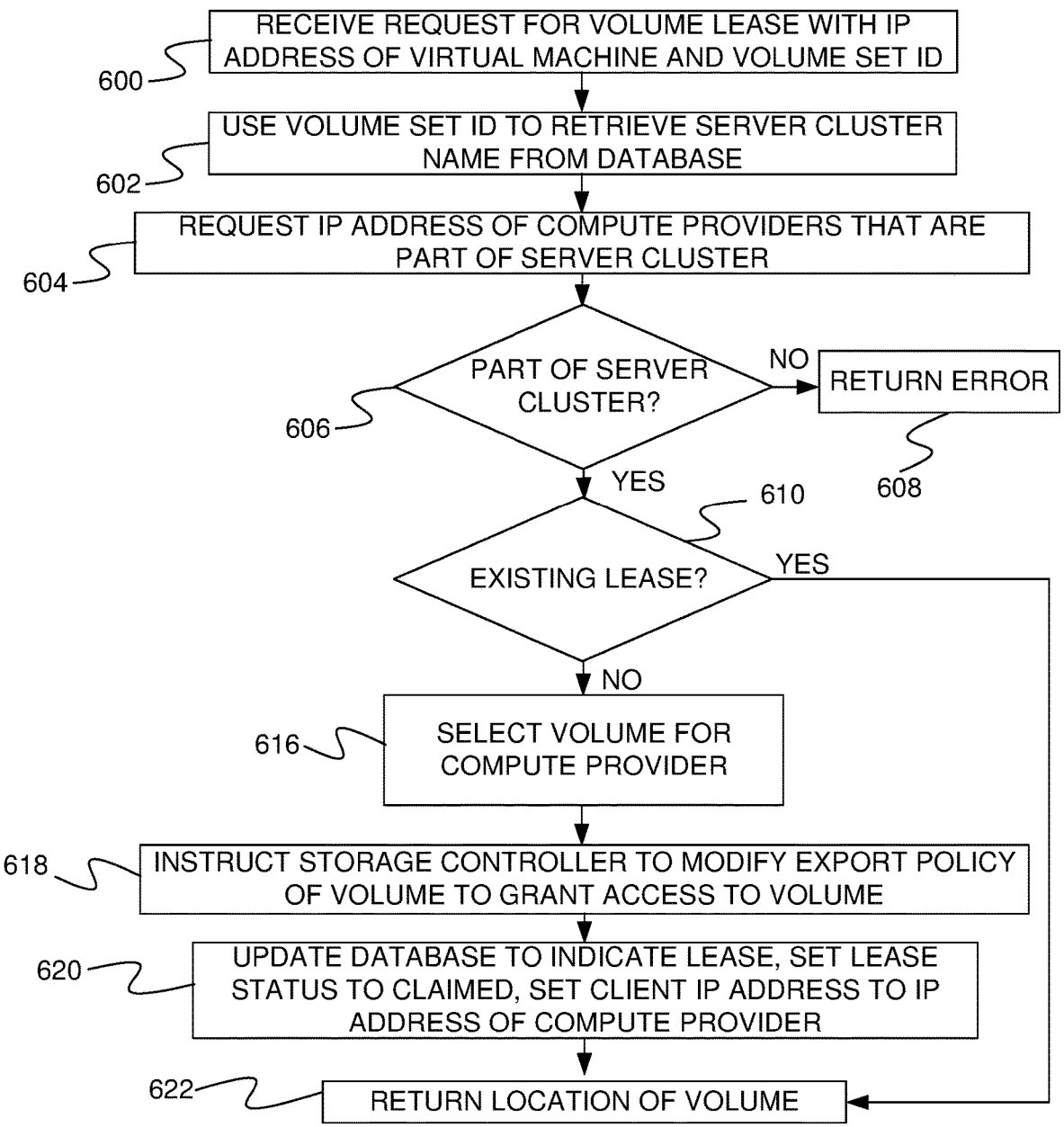
FIG. 6 is a flow diagram of a method of processing a request for a lease to a storage volume.

As mentioned above, when a compute provider of a server cluster is initially started, the compute provider makes a request for a lease to one of the storage volumes provisioned for the server cluster. FIG. 6 provides a flow diagram for processing such requests.

In step 600, a lease endpoint 250 in persistent storage manager 114 receives the lease request, which includes the IP address of the compute provider that wishes to access a storage volume and the unique identifier the volume set associated with the compute providers server cluster. At step 602, lease endpoint 250 uses the unique identifier of the volume set to retrieve the unique name of the server cluster associated with the volume set from database 202. At step 604, lease endpoint 250 sends a request to cluster manager 104 for the IP addresses of all compute providers assigned to the retrieved server cluster name. If no server cluster exists that has that server cluster name, cluster manager 104 returns an error. Otherwise, cluster manager 104 returns a list of IP addresses.

Lease endpoint 250 then determines whether the IP address provided in the volume lease request is in the list of IP addresses provided for the server cluster name. If the IP address is not part of the server cluster at step 606 or if cluster manager 104 returned an error, an error is returned at step 608.

The verification performed in steps 604 and 606 ensures that compute providers that are not part of the server cluster do not gain access to the storage volumes provisioned for the server cluster. This prevents data errors that would otherwise occur if compute providers outside of the server cluster gained access to the volumes provisioned for the server cluster. In addition, the architecture described above makes cluster manager 104 the sole source of truth as to which IP addresses are part of the cluster and which are not.

At step 610, lease endpoint 250 checks volume set database 202 to see if a volume has already been leased to the IP address of the compute provider. By performing this check, the volume leasing instance ensures a one-to-one relationship between compute providers and storage volumes such that each compute provider only receives access to one storage volume and each storage volume is only accessed by one compute provider. If a volume has already been leased to the compute provider, the location of the previously leased volume is returned to the compute provider at step 622.

If a volume has not already been leased to the IP address of the compute provider, lease endpoint 250 selects a volume for the compute provider at step 616. In accordance with one embodiment, the volume is selected from a collection of volumes that have a READY status and a lease status of AVAILABLE and that are in the set of volumes assigned to the server cluster. In accordance with one embodiment, lease endpoint 250 maintains a respective list of available volumes for each server cluster and selects the top volume in the list at step 616. In other embodiments, lease endpoint 250 searches volume set database 202 for all available volumes for the server cluster and arbitrarily selects one of the returned available volumes at step 616. Lease endpoint 250 then instructs storage controller 116 to modify the export policy of the found volume to provide the IP address of the compute provider with access to the volume at step 618. Lease endpoint 250 then updates database 202 at step 620 to store the identity of the lease, to set the status of the storage volume's lease to CLAIMED, and to set the client IP address of the storage volume to the IP address of the compute provider. At step 622, lease endpoint 250 returns the location of the volume to the compute provider that made the request for the lease. The compute provider then uses the location of the volume to access and mount the storage volume.

Figure 7:
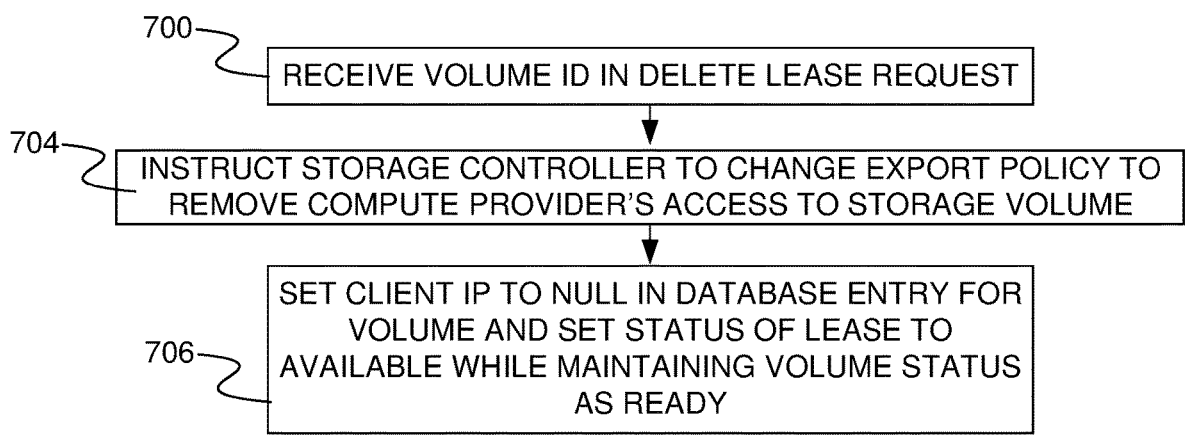
FIG. 7 is a flow diagram of a method for processing a request to release a lease to a storage volume.

When a compute provider is removed from a server cluster, the compute provider releases its volume lease. FIG. 7 provides a flow diagram of a method for processing a request to release a volume lease. At step 700, the compute provider uses an HTTP DELETE method directed to lease endpoint 250 that includes the identifier of the volume that is being released. At step 704, lease endpoint 250 instructs storage controller 116 to change the export policy of the volume to remove the compute provider's access to the storage volume. At step 706, lease endpoint 250 sets the client IP address of the volume to null in the database entry for the volume and sets the status of the lease to AVAILABLE while maintaining the volume status as READY. Thus, the volume is made available for another compute provider in the server cluster.

As shown in FIG. 2, persistent storage manager 114 also includes a storage assistant 270 that performs various tasks to maintain the integrity of persistent storage manager 114 and to manage the storage volumes. In particular, storage assistant 270 includes a canary module 272 that periodically executes HTTP methods directed to volume set endpoint 200 and lease endpoint 250 to invoke the various methods discussed above and evaluate whether persistent storage manager 114 is able to implement the methods correctly. In accordance with one embodiment, canary 272 tests all methods supported by persistent storage manager 114 on a regular basis including the formation of volume sets and the leasing and releasing of volumes within a volume set.

Storage assistant 270 also includes a cleanup module 274 that is responsible for periodically deleting volumes that have been marked as OFFLINE in volume set database 202. When a volume is deleted or a volume set is deleted through volume set endpoint 200, the volumes are not immediately deleted but instead, the status of the volumes in the volume set are set to OFFLINE in volume set database 202. The volumes will continue to be set aside for the volume set by storage controller 116 while they are in the OFFLINE state. When cleanup module 274 runs, it identifies all of the volumes that have an OFFLINE status and sends a request to storage controller 116 to release the volumes. After storage controller releases a volume, cleanup module 174 changes the status of the volume to DELETED.

Storage assistant 270 also includes an audit module 276 that compares the values stored in volume set database 202 to values maintained by storage controller 116. Thus, audit module 276 determines whether the volume sets found in volume set database 202 have corresponding physical volume sets maintained by storage controller 116.

Figure 8:
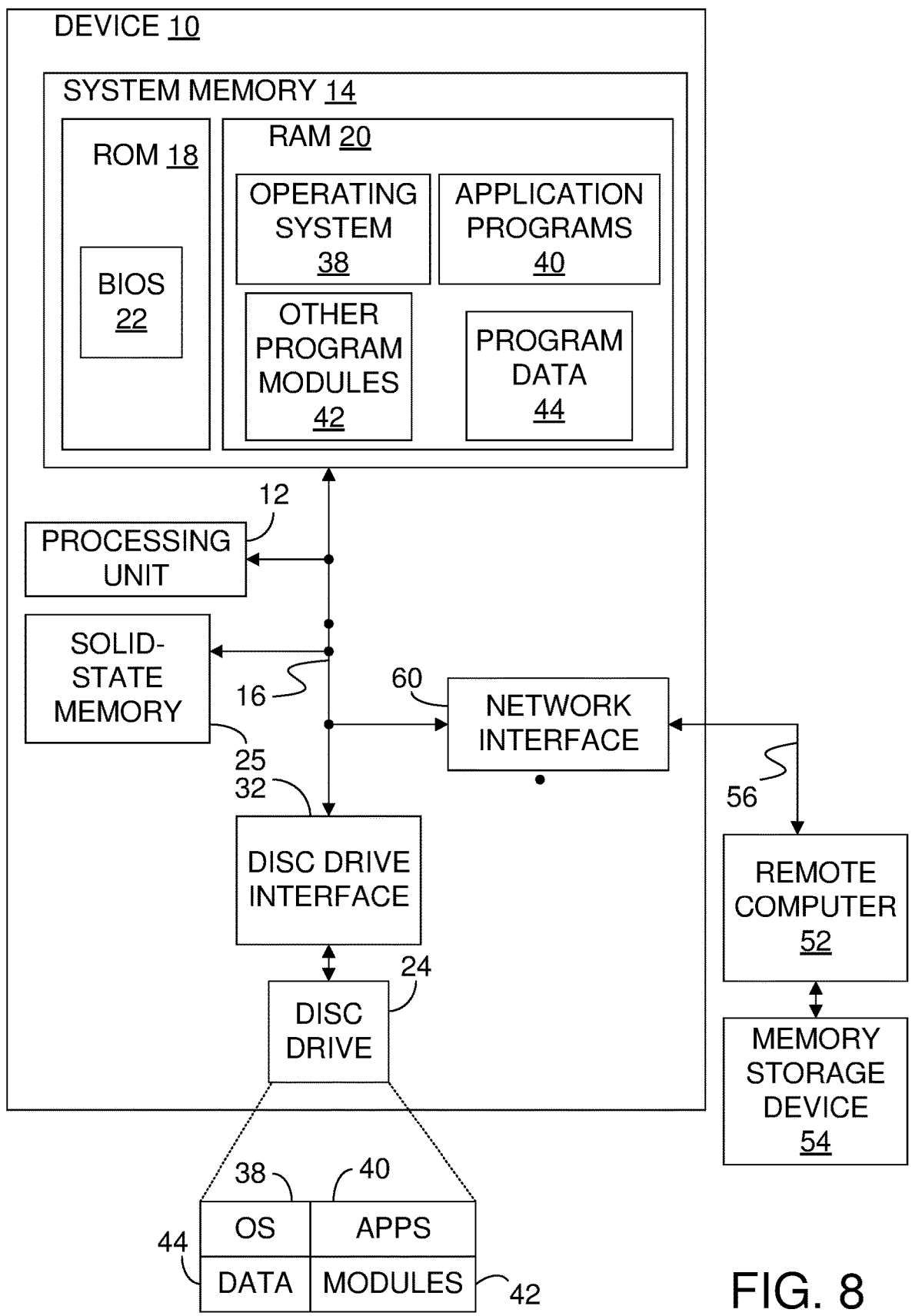
FIG. 8 is a block diagram of a computing device on which the various embodiments are executed.

FIG. 8 provides an example of a computing device 10 that persistent storage manager 114, storage controller 116, and cluster manager 104 can be executed on. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a solid state memory 25 and an optional hard disc drive 24. Hard disc drive 24 is connected to the system bus 16 by a hard disc drive interface 32. The drive and its associated computer-readable media provide nonvolatile storage media for the computing device 10 on which computer-executable instructions and computer-readable data structures may be stored. Other types of media that are readable by a computer may also be used in the exemplary operation environment as non-volatile memory such as solid-state memory.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14, solid state memory 25 and disc drive 24 to perform the methods described above.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 8. The computing device 10 is connected to remote computer 52 through a network interface 60.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 8 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
receiving a request to provision a set of storage volumes for a server cluster, wherein the request includes an identifier for the server cluster;
generating a provisioning work ticket for each storage volume in the set of storage volumes, each provisioning work ticket including the identifier for the server cluster;
providing the provisioning work tickets to a message broker; and
executing multiple volume provisioning instances such that at least two of the volume provisioning instances operate in parallel with each other and such that each volume provisioning instance receives a respective provisioning work ticket from the message broker and attempts to provision a respective storage volume of the set of storage volumes for the server cluster in response to receiving the volume provisioning work ticket.

2. The computer-implemented method of claim 1 further comprising:
one of the multiple volume provisioning instances encountering a problem provisioning a storage volume and in response, sending a provisioning work ticket to the message broker.

3. The computer-implemented method of claim 2 wherein the provisioning work ticket received from the message broker includes a retries-remaining value and wherein after the volume provisioning instance encounters the problem, the volume provisioning instance determines whether to send the provisioning work ticket based on the retries-remaining value.

4. The computer-implemented method of claim 3 wherein the request to provision the set of storage volumes includes a region where the set of storage volumes is to be located and wherein each generated provisioning work ticket includes the region.

5. The computer-implemented method of claim 1 further comprising after receiving the request to provision the set of storage volumes, generating an identifier for the set of volumes and returning the identifier for the set of volumes as part of a response to the request before the storage volumes for the set of storage volumes are provisioned.

6. The computer-implemented method of claim 5 further comprising:
receiving a request for a lease to a storage volume in the set of storage volumes together with the identifier for the storage volume and an IP address;
using the identifier for the storage volume to retrieve the identifier for the server cluster; and
sending a request to a cluster manager to verify that the IP address is for a compute provider in the server cluster.

7. The computer-implemented method of claim 6 further comprising searching a database containing entries for each storage volume in the set of storage volumes to determine whether a storage volume has been leased to the IP address before leasing a storage volume to the IP address.

8. A system comprising:
a processor for executing computer readable code stored in memory, the computer readable code comprising:
a cluster manager configured to define and manage a server cluster; and
a persistent storage manager configured to:
receive a request for a set of storage volumes for the server cluster wherein the request comprises an identifier for the server cluster;
provide an identifier for the requested set of storage volumes;
receive a request for a lease for a storage volume in the set of storage volumes, the request comprising the identifier for the set of storage volumes and an IP address of a compute provider that will access the storage volume; and
in response to receiving the request for the lease, verifying with the cluster manager that the IP address of the compute provider is part of the server cluster.

9. The system of claim 8 wherein after verifying that the IP address of the compute provider is part of the server cluster, the persistent storage manager determines whether any storage volume of the set of storage volumes is currently leased to the IP address.

10. The system of claim 8 wherein the persistent storage manager further provisions a plurality of storage volumes to form the set of storage volumes, wherein each storage volume is initially provisioned without providing compute providers in the server cluster access to the storage volume.

11. The system 10 wherein after receiving the request for the lease, the persistent storage manager searches a database containing entries for the storage volumes in the set of storage volumes to identify a storage volume that has been provisioned for the server cluster and is currently not leased to a compute provider.

12. The system of claim 8 wherein the persistent storage manager is further configured to:
generate a plurality of provisioning work tickets in response to receiving the request for the set of storage volumes, the plurality of provisioning work tickets comprising a separate provisioning work ticket for each storage volume of the set of storage volumes;
providing the provisioning work tickets to a message broker; and
executing multiple provisioning instances such that at least two of the provisioning instances operate in parallel with each other and such that each provisioning instance receives a respective provisioning work ticket from the message broker and attempts to provision a respective storage volume of the set of storage volumes for the server cluster in response to receiving the provisioning work ticket.

13. The system of claim 12 wherein when a provisioning instance encounters a problem provisioning a storage volume, the provisioning instance determines whether to send a new provisioning work ticket to the message broker to request provisioning of the storage volume.

14. The system of claim 8 wherein the persistent storage manager receives a request to release a lease for a storage volume and in response sets a lease status for the storage volume to AVAILABLE while maintaining the storage volume as part of the set of storage volumes.

15. A method comprising:
  receiving a request for an IP address to access to a storage volume in a set of storage volumes;
  using an identifier for the storage volume to identify a server cluster associated with the set of storage volumes;
  verifying that the IP address is part of the server cluster; and
  providing the IP address access to the storage volume.

16. The method of claim 15 further comprising:
  after receiving the request, determining whether any storage volumes in the set of storage volumes are available for lease;
  selecting one of the storage volumes available for lease; and
  wherein providing the IP address access to the storage volume comprises providing the IP address access to the selected storage volume.

17. The method of claim 16 further comprising determining that the IP address does not have access to a different storage volume in the set of storage volumes before providing the IP address access to the selected storage volume.

18. The method of claim 15 wherein the server cluster is associated with the set of storage volumes through steps comprising:
  receiving a request for provisioning the set of storage volumes together with an identifier for the server cluster;
  generating an identifier for the set of storage volumes; and
  provisioning each storage volume in the set of storage volumes.

19. The method of claim 18 wherein provisioning each storage volume in the set of storage volumes comprises:
  generating a plurality of provisioning requests, each provisioning request for a different storage volume of the set of storage volumes; and
  sending the plurality of provisioning requests to a message broker.

20. The method of claim 19 further comprising:
  executing multiple provisioning instances in parallel, each provisioning instance requesting a respective provisioning request from the message broker and attempting to provision a respective storage volume of the set of storage volumes.

* * * * *